(12) United States Patent
Qiao et al.

(10) Patent No.: US 7,756,142 B2
(45) Date of Patent: Jul. 13, 2010

(54) SIGNALING AGENT REALIZING METHOD BASED ON MEDIA GATEWAY CONTROL PROTOCOL

(75) Inventors: Kezhi Qiao, Shenzhen (CN); Zhengrong Yang, Shenzhen (CN); Gang Cao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 1010 days.

(21) Appl. No.: 10/568,702

(22) PCT Filed: Dec. 5, 2003

(86) PCT No.: PCT/CN03/01042

§ 371 (c)(1),
(2), (4) Date: Feb. 17, 2006

(87) PCT Pub. No.: WO2005/018188

PCT Pub. Date: Feb. 24, 2005

(65) Prior Publication Data

US 2006/0268897 A1 Nov. 30, 2006

(30) Foreign Application Priority Data

Aug. 19, 2003 (CN) ................................ 03 1 30582

(51) Int. Cl.
*H04L 12/12* (2006.01)
(52) U.S. Cl. ................... 370/401; 370/384; 370/373; 370/377; 370/496; 370/357; 370/389; 370/328
(58) Field of Classification Search ................ 370/410, 370/349, 352, 353, 249, 401, 230; 709/238, 709/220, 245, 230, 219, 224, 236
See application file for complete search history.

(56) References Cited

U.S. PATENT DOCUMENTS 7,146,410 B1 * 12/2006 Akman ...................... 709/220
(Continued)

FOREIGN PATENT DOCUMENTS

CN 1373971 10/2002
CN 1402451 3/2003
(Continued)

OTHER PUBLICATIONS

"RFC2705, Media Gateway Control Protocol Version 1.0" published Oct. 1999 by the Network Working Group, pp. 57-70.*
(Continued)

*Primary Examiner*—Hong Cho
*Assistant Examiner*—Yosief Berhane
(74) *Attorney, Agent, or Firm*—Harness, Dickey & Pierce, P.L.C.

(57) ABSTRACT

The present invention discloses a method for realizing signalling agent based on a media gateway control protocol, which comprises the following steps of: providing an agent equipment between media gateways and a media gateway controller that locate in different networks, the agent equipment providing signalling agent and network address translation between different networks; requesting for registering to the media gateway controller from a media gateway; for a MGCP/MEGACO signalling that is not related to media between the media gateway controller and the media gateway, directly replacing a transaction number by the agent equipment and then forwarding; for a MGCP/MEGACO signalling that is related to media, processing a media identifier correspondingly by the agent equipment and then forwarding. According to the present invention, transparent traversing of MGCP/MEGACO protocol among different networks can be realized to make a media gateway controller control media gateways not matter which network they locate in, in which messages on media gateways are dynamically generated by the agent equipment according to MGCP signallings, and operation maintenance cost decreases.

8 Claims, 3 Drawing Sheets

U.S. PATENT DOCUMENTS

| | | | |
|---|---|---|---|
| 7,224,696 B2* | 5/2007 | Bouleros et al. | 370/401 |
| 7,406,043 B1* | 7/2008 | Chu et al. | 370/230 |
| 2002/0141390 A1 | 10/2002 | Fangman et al. | |
| 2002/0150221 A1* | 10/2002 | Carson et al. | 379/126 |
| 2003/0033418 A1* | 2/2003 | Young et al. | 709/230 |
| 2003/0093563 A1* | 5/2003 | Young et al. | 709/245 |
| 2003/0233471 A1* | 12/2003 | Mitchell et al. | 709/238 |
| 2007/0217407 A1* | 9/2007 | Yuan et al. | 370/389 |

FOREIGN PATENT DOCUMENTS

| | | |
|---|---|---|
| EP | 1202530 | 5/2002 |
| WO | WO 0076107 | 12/2000 |

OTHER PUBLICATIONS

"RFC 3015- Megaco Protocol Version 1.0" published Nov. 2000 by the Network Working Group.*

European Search Report dated Oct. 28, 2009.

* cited by examiner

SIGNALING AGENT REALIZING METHOD BASED ON MEDIA GATEWAY CONTROL PROTOCOL

FIELD OF THE INVENTION

The present invention relates to a field of communication technology, specifically relates to a method for realizing signalling agent function with a media gateway control protocol.

BACKGROUND

Media Gateway Control Protocol (MGCP), is RFC2705 Protocol of the Internet Engineering Task Force (IETF), and Media Gateway Control (MEGACO) is RFC 3015 Protocol of IETF. Media Gateway Control Protocol (MGCP/MEGACO) is a protocol between soft switch equipment and media gateway for controlling action of media gateway.

With an idea of discomposing gateways, MEGACO/MGCP protocol discomposes original gateways processing signalling and media stream into two parts: media gateway (MG) and media gateway control (MGC). A physical logic entity on MG can be identified with endpoints, as shown in FIG. 1. A MGC controls action of a MG through MEGACO/MGCP Protocol, and processes requests submitted by a MG; a MG mainly processes information of media stream. Both MGC and MG are network elements in a network, and communicate with each other through MEGACO/MGCP Protocol.

Due to decomposition of MGC and MG, a MGC can control action of multiple MGs, and sometimes such situation may happen that a MGC and MGs controlled by it locate in different networks and thus an agent equipment is needed to realize signalling agent for MGC's controlling on MGs.

A signalling agent means to realize, by a signalling agent, traversing MGCP/MEGACO signalling and media stream controlled through networks, where MGC and MGs are in different networks and can not be reachable to one another by routes, so as to make MGC enable to control MGs in other networks completing call establishing and media stream intercommunicating.

Agent equipment is independent equipment, which provides signalling and media stream agent function among networks in a packet switching network and takes charge of providing signalling and media stream agent between different networks and network address translation.

At present, a common method for realizing signalling agent among different networks is based on network address translation (NAT), but in this method agent equipment cannot make MGC entirely transparent, and complexity for realizing call services on MGC is increased; meanwhile detailed information on corresponding MG needs to be configured on the agent equipment, and, thus, any change on MG under control of MGC requires informing the agent equipment to change configuration, which increases operation maintenance cost.

SUMMARY OF THE INVENTION

In the present invention, a technical problem to be solved is to provide a method for realizing signalling agent based on media gateway control protocol to overcome shortcomings in the prior art, to implement transparent traversing of MGCP/MEGACO protocol among different networks, to make MGC not concern network location of MGs, and to decrease operation maintenance cost.

The method for realizing signalling agent based on media gateway control protocol provided by the present invention comprises the following steps of:

providing agent equipments among media gateways and a media gateway controller located in different networks, the agent equipment providing signalling agent and network address translation function among different networks;

requesting for registering a media gateway in the media gateway controller;

if a MGCP/MEGACO signalling between a media gateway and the media gateway controller is not related to media, directly replacing transaction number on the agent equipment and then forwarding; if a MGCP/MEGACO signalling is related to media, processing media attribute correspondingly by the agent equipment and then forwarding.

All media gateways under same media gateway controller have different domain names, every endpoint includes domain name information of the media gateway, and the media gateway controller can distinguishes media gateways according to their domain names in endpoint identifiers.

The step of registering media gateways in the media gateway controller further comprises.

sending a register request message from a media gateway to the media gateway controller, recording message identifier of the media gateway received by the agent equipment to generate a piece of information about this media gateway;

assigning a new transaction number by the agent equipment to the register request message to replace original transaction number in the register request message, recording the media gateway sending the request, and then forwarding the register request message to the media gateway controller;

sending a register response message to the media gateway from the media gateway controller after the media gateway registers successfully;

determining the media gateway by the agent equipment according to the new transaction number in the register response message, replacing the new transaction number with original transaction number, and forwarding the register response message to corresponding media gateway.

The step of replacing the transaction number by the agent equipment further comprises:

assigning a new transaction number to each of the request message registers sent from the media gateway to the media gateway controller, by the agent equipment, and recording the media gateway sending the request message;

finding corresponding media gateway by the agent equipment according to the new transaction number reassigned, after receiving the response message to the request message sent by the media gateway controller, replacing the new transaction number in the response message with original transaction number, and then forwarding the response message to corresponding media gateway;

sending a request message, sent from the media gateway controller to a media gateway, to corresponding media gateway by the agent equipment according to domain name in endpoint identifier.

The step of processing a MGCP/MEGACO signalling related to media by the agent equipment further comprises:

creating or modifying corresponding media forwarding port and forwarding table on the agent equipment after receiving a creating or modifying connection signalling sent from the media gateway controller to a media gateway;

replacing related media information in the signalling with corresponding network address information of the media forwarding port on the agent equipment, and forwarding the signalling to corresponding media gateway;

if the signalling is a signalling for creating a connection, recording endpoint identifier of the connection on the agent equipment;

modifying forwarding table of corresponding media forwarding port by the agent equipment according to a response signalling when the media gateway sends the response signalling related to media to the media gateway controller;

replacing media information in the response signalling on the agent equipment with network address information of corresponding media port, and then sending to the media gateway controller;

sending a release connection signalling to the media gateway from the media gateway controller after calling finishes, releasing corresponding media forwarding port by the agent equipment according to endpoint identifier, and then forwarding the signalling to corresponding media gateway.

The method of the present invention requires no configuration on any information about media gateways based on MGCP/MEGACO protocol, and the media gateways can directly be controlled by the media gateway controller. Thus, the media gateway controller does not concern with whether media gateways are in same network or not, which facilitates services realized on the media gateway controller. Meanwhile, any change on service control on the media gateway needs only perform on the media gateway controller, but not modify on the agent equipment, thus user management is highly facilitated. Furthermore according to the present invention multiple agent equipments may be used for implementing the media gateway traversing through more networks for multiple times.

DETAILED DESCRIPTION OF THE INVENTION

The present invention will be further described in details in a combination with attached drawings and embodiments below.

Figure 1:
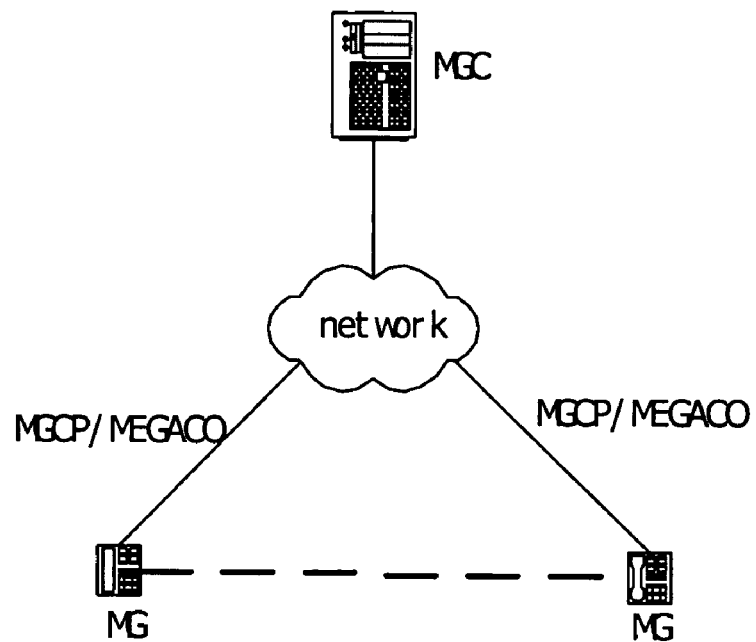
FIG. 1 is a schematic diagram of a system adopting MGCP/MEGACO protocol.

FIG. 1 is a schematic diagram of a system in the prior art, which is already introduced in background and will not repeat here.

Figure 2:
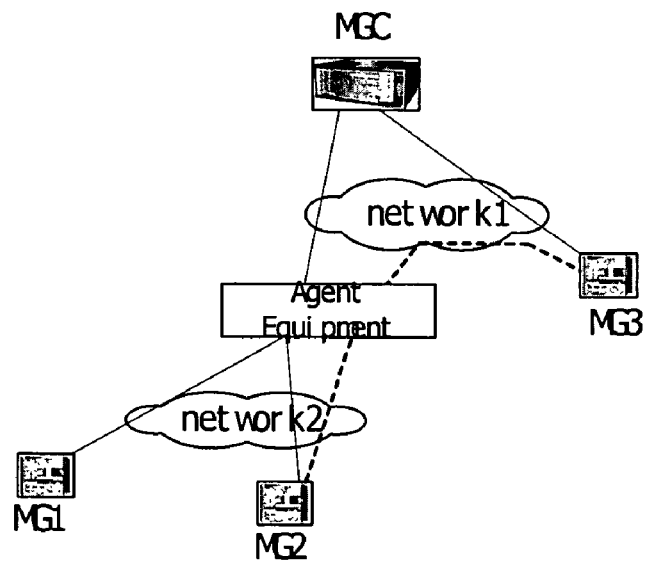
FIG. 2 is a schematic diagram of an embodiment of a system adopting MGCP/MEGACO protocol.

In a schematic diagram of a system realizing MGCP/MEGACO signalling agent according to the present invention as shown in FIG. 2, a media gateway controller MGC and a media gateway MG3 locate in network 1, media gateways MG1 and MG2 locate in network 2, and the media gateway controller controls media gateways MG1, MG2 and MG3 by MGCP/MEGACO protocol.

According to the method provided by present invention, an agent equipment is provided between MGC and MG1, MG2 that are not in same network, that is an agent equipment between network 1 and network 2. All MGs under control of same MGC have different domain names, and MGC distinguishes uniquely each MG by its domain name in endpoint identifier.

The agent equipment has at least two network addresses; one is address BIP1 in network 1 where MGC locates, the other one is address BIP2 in network 2 where MG1 and MG21 locate. IP addresses and port of MGC configured on MG1 and MG2 are address BIP2 and port P2 of the agent equipment; and MGC distinguishes MGs by their domain names.

Figure 3:
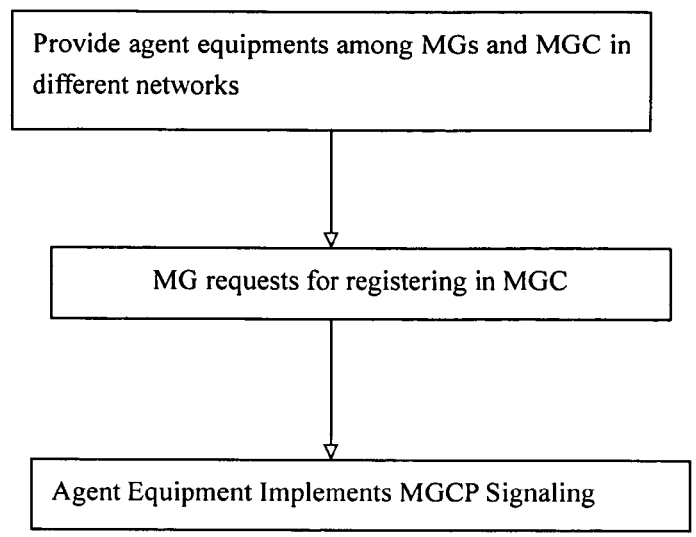
FIG. 3 is a flow chart for realizing MGCP/MEGACO information agent according to the present invention.

FIG. 3 is a flow chart for realizing MGCP/MEGACO information agent on the agent equipment according to the present invention, firstly, an agent equipment is provided between MG and MGC in different networks, and provides signalling agent and network address translation functions among different networks. Then MG registers to MGC, after registering successfully, for a MGCP signalling between MGC and MG that is not related to media, the agent equipment directly replaces transaction number and then forwards; for a MGCP signalling that is related to media, the agent equipment processes media identifier correspondingly and then forwards.

Figure 4:
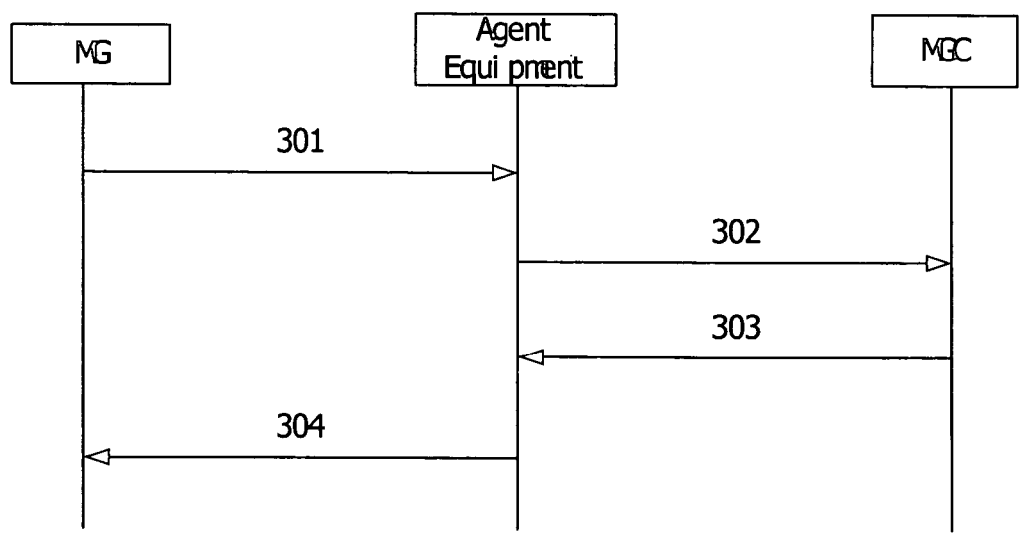
FIG. 4 is a schematic diagram for dynamically generating MG information on the agent equipment according to the present invention.
Figure 5:
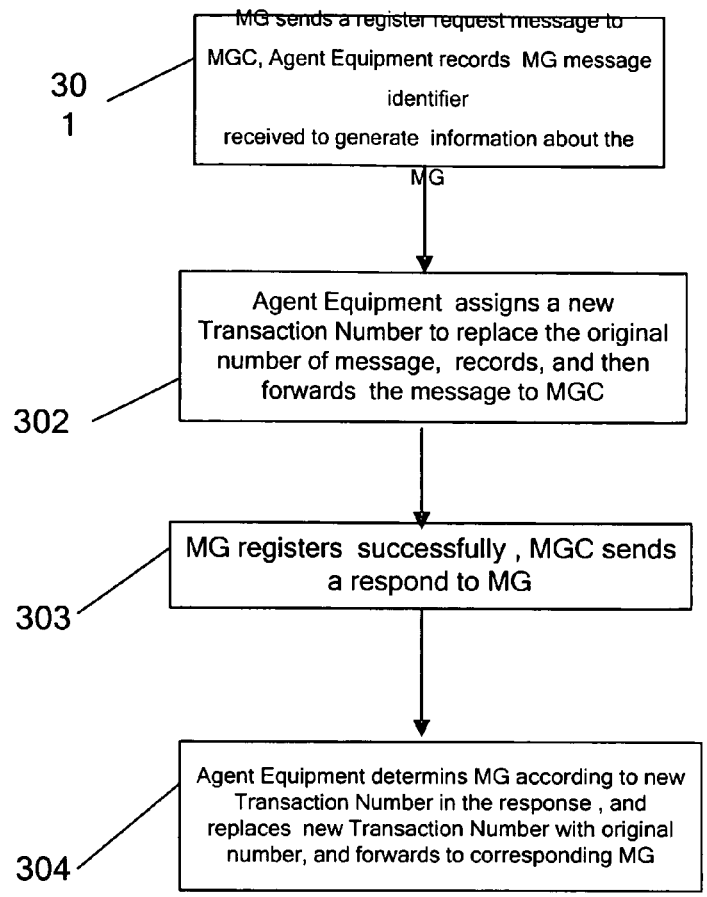
FIG. 5 is a flow chart of a registering process from a media gateway to a media gateway controller.

FIG. 4 and FIG. 5 show processes of requesting for registering MG. in MGC;

Step 301: MG sends a RSIP message to MGC for registering, in which its transaction number is TransID, Agent equipment receives the message on address BIP2 and port P2 and records attributes such as source address and port number of MG message received and domain name of MG, to generate a piece of information about the MG;

Step 302: The agent equipment reassigns a transaction number TransID' to the registering message, replaces original transaction number TransID in the registering message with it, records corresponding relation of TransID and TransID', and then forwards the registering message to MGC from BIP1 address;

Step 303: MGC registers MG successfully according to its domain name, and then sends a response message to MG;

Step 304: After receiving the response message returned by MGC from address BIP1, the agent equipment finds corresponding record according to the transaction number TransID' in the response message, obtains MG sending the registering message and its original transaction number TransID, replaces the transaction number TransID' in the response message with TransID, and forwards to corresponding MG from address BIP2.

After receiving each of request messages sent to MGC by MG, the agent equipment reassigns a new transaction number to the request message, replaces original transaction number with the new transaction number, and then records MG sending the request. After receiving a response message returned by MGC for the request message, the agent equipment finds corresponding MG according to the reassigned new transaction number, replaces the new transaction number in the response message with the original transaction number, and then forwards the response message to corresponding MG. For a request message sent to MG by MGC, the agent equipment forwards to corresponding MG according to domain name contained in the endpoint identifier.

Figure 6:
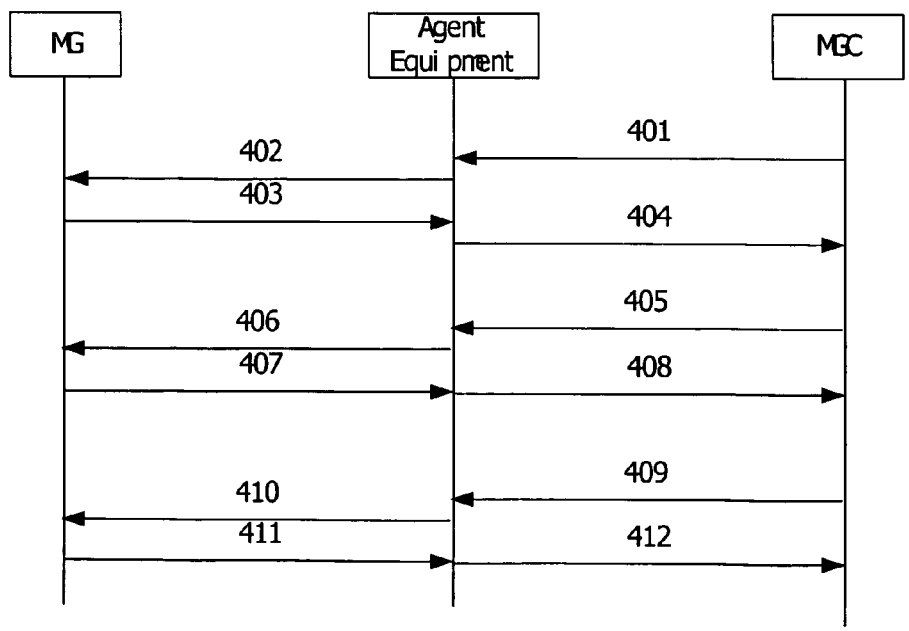
FIG. 6 is a flow chart of a process for forwarding media stream through networks by signalling agent according to the present invention.

FIG. 6 represents a process for forwarding media stream over networks realized by MGCP signalling agent through the agent equipment.

Step 401: MGC send MG a signalling CRCX for establishing a connection port on MG, the agent equipment analyzes the signalling, then knows that the signalling is related to media, and establishes a corresponding media forwarding port A' on the agent equipment; if the signalling CRCX has remote connection attribute, a media forwarding table is established on the media forwarding port A' with IP and port in the signalling, and IP and port in the signalling is modified into address BIP2 and Port A' on the agent equipment; meanwhile, name for endpoint identifier of connection to be established by MG is recorded.

Step 402: The agent equipment forwards MG the CRCX signalling with modified remote connection attribute;

Step 403: after creating the connection port successfully according to the signalling, MG sends a response message for CRCX signalling, the agent equipment receives the response message, then modifies media forwarding table on port A' with IP and port in local connection attribute of the response message, and replaces IP and port in local connection attribute of the response message with address BIP1 and port A';

Step 404: the agent equipment forwards MGC the response message for CRCX with modified local connection attribute;

Step 405: MGC sends MG a MDCX signalling for modifying a connection port on MG, and the agent equipment finds media forwarding port A' according to endpoint identifier of MG connection recorded, then modifies media forwarding table on port A' with IP and port in remote connection attribute of the MDCX signalling, and modifies IP and port in the MDCX signalling with BIP2 and port A';

Step 406: the agent equipment forwards MG the MDCX signalling with modified remote connection attribute;

Step 407: MG returns a response message for modifying connection successfully;

Step 408: the agent equipment forwards the response message to MGC;

Step 409: after the call ends, MGC sends MG a DLCX signalling for releasing connection, and the agent equipment finds corresponding media forwarding port A' according to endpoint identifier, and releases media forwarding port A';

Step 410: the agent equipment forwards the DLCX message to MG;

Step 411: MG releases connection according to the signalling, and after done successfully replies to MGC; and Step 412: the agent equipment forwards MGC the reply to the signalling.

If MG needs traverse through multiple networks for multiple times, multiple agent equipments may be used for realization.

It should be noted that the embodiments above are only for describing the solutions of the present invention but not for limiting. Although the present invention is described with embodiments, an ordinary person skilled in the art should understand that various modifications and variations may be made in the present invention without departing from the spirit or scope of the invention, which all should be covered within the scope of the appended claims of the present invention.

What is claimed is:

1. A method for realizing signaling agent based on a media gateway control protocol, comprising:
    providing an agent equipment between media gateways and a media gateway controller that locate in different networks, the agent equipment providing signaling agent and network address translation between different networks; and
    requesting to register the media gateway controller from a media gateway; wherein:
    for a Media Gateway Control Protocol or Media Gateway Control (MGCP or MEGACO) signaling sent from the media gateway to the media gateway controller, if not related to media, directly replacing a transaction number by the agent equipment and then forwarding according to domain name in endpoint identifier; and if the MGCP or MEGACO signaling is related to media, processing a media attribute correspondingly by the agent equipment and then forwarding; and
    if the MGCP or MEGACO signaling is related to media, creating or modifying a corresponding media forwarding port and a forwarding table on the agent equipment after receiving a signaling for establishing or modifying a connection sent to a media gateway from the media gateway controller, replacing relevant information on media in the signaling with information on corresponding network address of the media forwarding port on the agent equipment, and then forwarding the signaling to the media gateway; and
    for a MGCP or MEGACO signaling sent from the media gateway controller to media gateway, sending the request message to corresponding media gateway by the agent equipment according to domain name in endpoint identifier.

2. The method for realizing signaling agent based on a media gateway control protocol of claim 1, wherein each of all media gateways under control of same media gateway controller has different domain name, each endpoint identifier includes domain name information of a media gateway, and the media gateway controller distinguishes media gateways according to their domain names in the endpoint identifiers.

3. The method for realizing signaling agent based on a media gateway control protocol of claim 1, wherein the step of requesting for registering to the media gateway controller from a media gateway further comprises:
    sending a request message for registering to the media gateway controller from the media gateway, and recording message identifier of the media gateway received by the agent equipment to generate a piece of information about the media gateway;
    assigning by the agent equipment a new transaction number to the request message for registering to replace original transaction number in the request message for registering;
    recording the media gateway sending the request, and then forwarding the request message for registering to the media gateway controller;
    registering the media gateway successfully, and then sending a response message for registering to the media gateway from the media gateway controller; and
    determining the media gateway by the agent equipment according to the new transaction number in the response message for registering, replacing the new transaction number with the original transaction number, and then forwarding the response message for registering to corresponding media gateway.

4. The method for realizing signaling agent based on a media gateway control protocol of claim 1, wherein the step of replacing a transaction number by the agent equipment further comprises:
    for each of request messages sent from the media gateway to the media gateway controller, assigning a new transaction number for a request message by the agent equipment, and recording the media gateway sending the request message;
    after receiving on the agent equipment a response message for the request message sent by the media gateway controller, finding a corresponding media gateway according to a new transaction number assigned, replacing the new transaction number in the response message with original transaction number, and then forwarding the response message to the corresponding media gateway.

5. The method for realizing signaling agent based on a media gateway control protocol of claim 1, wherein the step of processing the MGCP or MEGACO signaling that is related to media by the agent equipment further comprises:

if the signaling is a signaling for creating a connection, further recording on the agent equipment an endpoint identifier of the connection, modifying the forwarding table of a corresponding media forwarding port on the agent equipment according to a response signaling when the media gateway sends the media gateway controller the response signaling related to media;

replacing media information in the response signaling with information on network address of corresponding media port on the agent equipment, and then sending to the media gateway controller; and sending a signaling for releasing the connection to the media gateway from the media gateway controller after calling finishes, releasing the corresponding media forwarding port on the agent equipment according to the endpoint identifier, and then forwarding the signaling to the media gateway.

6. The method for realizing signaling agent based on a media gateway control protocol of claim 2, wherein the step of requesting for registering to the media gateway controller from a media gateway further comprises:

sending a request message for registering to the media gateway controller from the media gateway, and recording message identifier of the media gateway received by the agent equipment to generate a piece of information about the media gateway;

assigning by the agent equipment a new transaction number to the request message for registering to replace original transaction number in the request message for registering, recording the media gateway sending the request, and then forwarding the request message for registering to the media gateway controller;

registering the media gateway successfully, and then sending a response message for registering to the media gateway from the media gateway controller; and determining the media gateway by the agent equipment according to the new transaction number in the response message for registering, replacing the new transaction number with the original transaction number, and then forwarding the response message for registering to corresponding media gateway.

7. The method for realizing signaling agent based on a media gateway control protocol of claim 2, wherein the step of replacing a transaction number by the agent equipment further comprises:

for each of request messages sent from the media gateway to the media gateway controller, assigning a new transaction number for a request message by the agent equipment, and recording the media gateway sending the request message;

after receiving on the agent equipment a response message for the request message sent by the media gateway controller, finding a corresponding media gateway according to a new transaction number assigned, replacing the new transaction number in the response message with original transaction number, and then forwarding the response message to the corresponding media gateway.

8. The method for realizing signaling agent based on a media gateway control protocol of claim 2, wherein the step of processing the MGCP or MEGACO signaling that is related to media by the agent equipment further comprises:

if the signaling is a signal for creating a connection, further recording on the agent equipment an endpoint identifier of the connection, modifying the forwarding table of a corresponding media forwarding port on the agent equipment according to a response signaling when the media gateway sends the media gateway controller the response signaling related to media;

replacing media information in the response signaling with information on network address of corresponding media port on the agent equipment, and then sending to the media gateway controller; and sending a signaling for releasing the connection to the media gateway from the media gateway controller after calling finishes, releasing the corresponding media forwarding port on the agent equipment according to the endpoint identifier, and then forwarding the signaling to the media gateway.

\* \* \* \* \*